US008249809B2

(12) United States Patent  
Leijtens

(10) Patent No.: US 8,249,809 B2  
(45) Date of Patent: Aug. 21, 2012

(54) STAR TRACKER WITH BAFFLE

(75) Inventor: Johannes Adrianus Petrus Leijtens, Bleiswijk (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 483 days.

(21) Appl. No.: 12/445,040

(22) PCT Filed: Oct. 11, 2007

(86) PCT No.: PCT/NL2007/050494
§ 371 (c)(1),
(2), (4) Date: Jul. 15, 2009

(87) PCT Pub. No.: WO2008/044931
PCT Pub. Date: Apr. 17, 2008

(65) Prior Publication Data
US 2010/0100322 A1    Apr. 22, 2010

(30) Foreign Application Priority Data
Oct. 12, 2006 (EP) .................................. 06076878
Oct. 31, 2006 (EP) .................................. 06076952

(51) Int. Cl.
*B64G 1/36* (2006.01)
*G02B 27/00* (2006.01)

(52) U.S. Cl. ............... 701/513; 250/203.1; 356/139.01; 359/601; 343/840

(58) Field of Classification Search .......... 701/222, 701/513, 207, 223, 514, 408; 250/203, 203.6, 250/203.1, 214.1, 227.11; 244/171; 359/601, 604, 605, 609; 434/111; 356/139.01; 342/42–51; 343/840

See application file for complete search history.

(56) References Cited

U.S. PATENT DOCUMENTS

| | | | |
|---|---|---|---|
| 4,491,727 A | | 1/1985 | Appelbaum et al. |
| 4,914,284 A | * | 4/1990 | Halldorsson et al. ...... 250/206.2 |
| 4,942,291 A | * | 7/1990 | Dietrich .................... 250/203.3 |
| 5,745,869 A | * | 4/1998 | van Bezooijen ............ 701/222 |
| 6,199,988 B1 | | 3/2001 | Krawczyk |
| 6,490,801 B1 | * | 12/2002 | Hersom et al. ................. 33/268 |
| 6,791,073 B1 | * | 9/2004 | Bell et al. .................... 250/214.1 |
| 2003/0067680 A1 | | 4/2003 | Weinstein et al. |

OTHER PUBLICATIONS

International Search Report for PCT/NL2007/050494 dated Dec. 17, 2007.

* cited by examiner

*Primary Examiner* — Ronnie Mancho
(74) *Attorney, Agent, or Firm* — Leydig, Voit & Mayer, Ltd.

(57) ABSTRACT

A star tracker is used to measure the direction of stars. Preferably a wide imaging range is provided so that a reliable orientation of the star tracker can be computed from measurements of the directions of star at substantially different directions. The star tracker comprises a light baffle and located between the light baffle and an image sensing arrangement. The light baffle comprises an array of walls, including sidewalls and at least one internal wall between the sidewalls. Preferably, the side walls and the at least one internal wall are oriented at mutually different orientations emanating from a virtual line of intersection of the planes of the walls. Thus a range of star directions can be imaged with constant sensitivity.

14 Claims, 4 Drawing Sheets

STAR TRACKER WITH BAFFLE

FIELD OF THE INVENTION

The invention relates to a star tracker and to a method of measuring a direction towards a celestial object.

BACKGROUND

Star trackers can be used to measure the direction towards selected stars. This can be used in a space vehicle, for example, to determine the orientation of the space vehicle.

U.S. Pat. No. 5,745,869 describes a star tracker. The star tracker images a part of the sky onto an image sensor. From the pattern of stars in the image a specific star is identified and from the position of that star in the image the direction of the star is determined.

In order to determine orientation relative to the stars the direction of at least two stars with substantially different directions needs to be determined. Usually a plurality of star trackers is used for this, directed at different parts of the sky. To get an accurate orientation the mechanical orientation of these star trackers relative to a reference frame (e.g. the frame of a space vehicle) has to be accurately known. This requires cumbersome calibration.

A problem in the operation of a star tracker is the effect of stray light from the sun. As used herein, the word star excludes the sun (but it may include planets and other celestial objects, natural or man-made). Apart from imaging objects lenses also scatter a small fraction of incident light in unintended directions. As the light intensity from the sun is much greater than that of stars, scattering of sunlight by the lens can significantly reduce the ability to detect faint stars.

U.S. Pat. No. 5,745,869 describes the use of a sun shade (a baffle) to prevent that light from the sun can reach the lens. The baffle has the shape of a frustrated cone, diverging towards the stars and with its central axis aligned with the optical axis of the lens of the star tracker. As long as the direction of the sun (or other high intensity object such as the earth or the moon) is sufficiently off-angle with the optical axis, the baffle prevents light from the sun to impinge on the lens, thereby preventing scattering by the lens.

The minimum angle distance between the optical axis and the sun needed to avoid scattering depends on the size of the baffle. There is a problem when this minimum angle has to be small, as in this case the baffle must be large.

U.S. Pat. No. 6,199,988 describes an optical instrument with a retractable baffle. The baffle wall has a number of segments. In a retracted configuration the segments lie flat against a surface that is perpendicular to the optical axis. In the active configuration the segments are rotated from the surface, so that they make an angle of less than ninety degrees with the optical axis. In one embodiment the mechanism for rotating the segments has the effect that the cross-section of the segments with a plane perpendicular to optical axis takes the shape of a pointed star, with concave indentations between the points of the star, so that segments of the baffle wall are partly interposed between other segments of the baffle wall. Various other baffle shapes with concave sections are described as well.

In each of these embodiments it is ultimately the length of the baffle segments in the direction of the optical axis that determines the angles of baffled light, although the concave sections may introduce a variation of the baffled range of angles as a function of direction. The patent uses retractable baffles to make it possible to realize segments with greater length, without requiring a large structure in the retracted configuration. Hence, this baffle also has the problem that the baffle must be large when the minimum baffled angle has to be small.

US patent application no 2003/0067680 describes a multi-axis imaging system that is somewhat like an insect's eye, with an array of lenses and a plurality of baffles, each between a respective one of the lenses and a light detector.

In the unrelated art of optical communication devices, U.S. Pat. No. 6,791,073 discloses that an optical communications receiver can be provided with a multi-apertured baffle in the shape of a honeycomb, with walls between the apertures in parallel with the line of sight from the receiver to the transmitter. A telescope, with an optical detector in its focus is located behind the baffle. The multi-apertured baffle reduces the range of direction from which light can be focussed on the detector. As this publication relates to optical communication the receiver contains a simple detector and not an image sensor, nor does the publication address the problem of scattered light.

SUMMARY OF THE INVENTION

Among others, it is an object to provide for a star tracker wherein the size of the baffle can be reduced.

In an embodiment it is an object to provide for a star tracker that is able to measure positions of a plurality of stars in a wide range of directions wherein the size of the baffle can be reduced.

A star tracker according to claim 1 is provided. Herein light baffle is used that comprises an array of walls, including sidewalls and at least one internal wall between the sidewalls. By using an array of walls at least the same baffling effect can be reached as with a larger baffle without internal walls.

In an embodiment an orientation computing circuit is used to compute an orientation of the star tracker relative to a combination of celestial objects, from measured positions of the celestial objects in one or more images sensed by the image sensing arrangement at a common orientation of the sensing arrangement relative to the celestial objects. The range of angles from which light is passed by the light baffle is selected so that an accurate three-dimensional orientation of the sensing arrangement relative can be computed from the different orientations. A range of forty-five degrees may be used for example. Thus no plurality of star trackers is needed to measure orientation and alignment problems are reduced.

In an embodiment the side walls and the at least one internal wall are oriented at mutually different orientations. Thus a larger range of orientations can be imaged with less direction dependent sensitivity. In a further embodiment the side walls and the at least one internal wall lie in virtual planes that have a common line of intersection. This minimizes direction dependence of the sensitivity. The orientation of the walls is selected so that, as far as they are imaged on the image sensor, they are imaged in side view, only their thickness being visible. In a further embodiment an internal wall comprises protrusions at its proximate end. This prevents unpredictable blocking effects due to irregularities on the walls. Preferably the internal sidewalls provided at regular angles. This provides for equal sensitivity in different direction ranges.

In an embodiment the optics of the star tracker comprise a single common objective for imaging light passed by different compartments of the baffle onto the image sensing arrangement. Thus alignment problems are reduced. In a further embodiment the side walls of the baffle extend to edges of an aperture stop of the common objective. Thus a maximum range of directions can be handled by each compartment.

In another embodiment a plurality of lenses located at ends of the side walls and the internal walls is provided. Thus cross scattering effects are reduced.

The image sensing arrangement may comprise an integrated circuit with a matrix of light sensing elements located to receive imaged light from all compartments. Alternatively a plurality of separate matrixes of light sensing elements mat be used, each matrix located to receive imaged light from a respective compartment. Thus cross-coupling interference due to sensing is minimized.

BRIEF DESCRIPTION OF THE DRAWINGS

These and other objects and advantages will become apparent from a description of exemplary embodiments, using the following drawings.

DETAILED DESCRIPTION OF THE DRAWINGS

Figure 1:
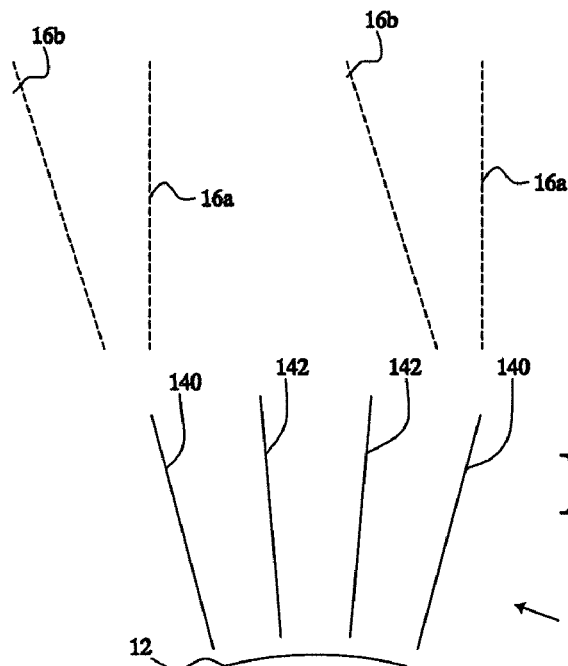
FIG. 1 schematically shows a cross-section of a star tracker.

FIG. 1 schematically shows a cross-section of a star tracker. The star tracker comprises an image sensor 10 coupled to a computer 11, an objective 12 (shown schematically as a single lens) and a baffle 14. Baffle 14 comprises an array of walls, including sidewalls 140 and one or more internal walls 142. Internal walls 142 partition the interior of the baffle into a number of compartments. The walls 140, 142 are directed at non-zero angles relative to each other. In the example of FIG. 1, their cross-sections radiate from a virtual common point. Although two internal walls 142 have been shown but way of example it should be appreciated that one internal wall 142, or more than two internal walls 142 may be used.

In operation light from different stars reaches the star tracker from different directions (symbolized by dashed lines 16a,b in the figure). Due to the angles between the internal walls 142 of baffle 14, part of the light from each star is blocked out, but from certain directions at least part of the light reaches the objective 12 unhindered by the internal walls 142 of baffle 14 in at least one compartment of the baffle.

Figure 2:
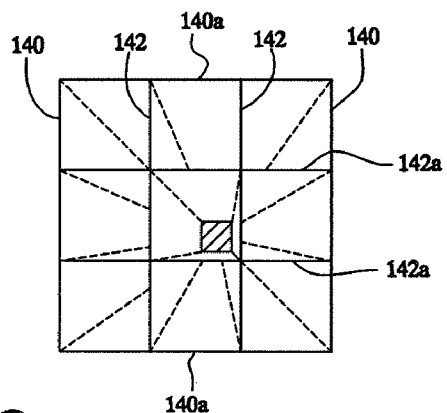
FIG. 2 schematically shows a top view of a star tracker.

FIG. 2 shows a schematic top view of baffle 14, viewed along the optical axis of objective 12 in orthogonal projection (i.e. as if the point of view is at infinity). As can be seen sidewall 140, 140a along two mutually transverse directions are used, as well as a grid of internal walls 142, 142a, with respective groups of sidewalls along the mutually transverse directions respectively. Furthermore, because the surface of the walls is visible, be it at an acute angle, it can be seen that the sidewalls 140, 140a and internal walls 142, 142 are not all parallel to each other and to the optical axis of objective 12.

Sidewalls 140 preferably start from opposite edges of the aperture stop of objective 12 (i.e. a narrowest diameter in front of objective 12 along the optical path through which rays from all directions pass). Sidewalls 140 are directed in the direction of the furthest off angle directions from which starlight must be imaged on image sensor 10. Internal walls 142 are directed along regularly spaced intermediate angles between these angle directions (i.e. so that their orientations subdivide the angle range between sidewalls 140 into equal sub-ranges). Sidewalls 140 and internal walls lie in virtual planes that emanate from a common virtual line of intersection defined by the virtual intersection of the virtual planes of the side walls 140. The orientation of the walls is selected so that, as far as they are imaged on the image sensor, they are imaged in side view, only their thickness being visible. The same goes for the transverse sidewalls 140a and transverse internal walls, with a transverse virtual line of intersection transverse to the line of intersection of the virtual planes of the first mentioned sidewalls 140. The thickness of the internal walls is preferably as small as allowed by requirements of mechanical stability and much smaller than the distance between successive walls (e.g. less than ten percent or even less than one or two percent of this distance). The internal wall separates a pair of successive ranges of angles from which the image sensor is able to sense light. The internal wall has an orientation corresponding to substantially meeting ends of these ranges (i.e. meeting as far as allowed by the thickness of the wall).

Figure 1A:
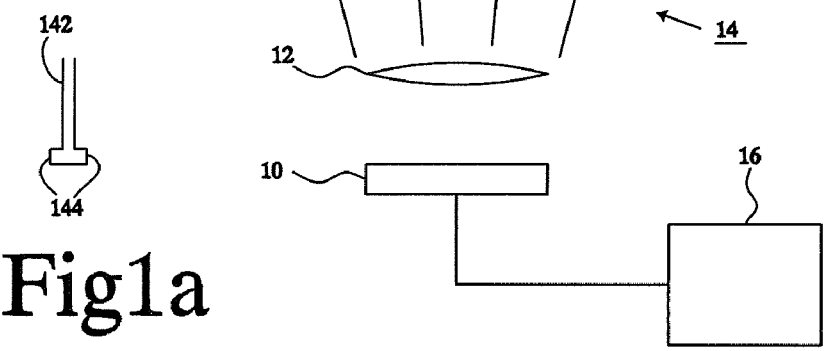
FIG. 1a shows detail of an internal wall in cross-section.

FIG. 1a shows a detail of an embodiment of an internal wall 142. Herein a proximate edge of the internal wall 142 (i.e. the edge nearest objective 12 (not shown)) has protrusions 144 extending along the edge. The protrusions extend further from the plane of internal wall 142 than any expected irregularities on the sidewall, so that the direction of blocking is determined by the protrusions 144 and not by irregularities. Similar (possibly one sided) protrusions may be under on sidewalls 140.

In operation the star tracker is used to measure the direction of a plurality of stars in mutually different directions, using a single orientation of the star tracker. For this purpose, objective 12 and image sensor 10 are combined to provide wide-angle imaging, for example over a range of forty-five degrees (twenty two and a half degrees on either side of the optical axis). Computer 11 receives image data from image sensor 10 and identifies stars in the image. From the positions where these stars have been imaged computer 11 computes the orientation of the star tracker relative to the stars. Methods of identifying stars and computing orientation are known per se and will therefore not be described. Instead of computer 11 a signal processing circuit may be used. The signal processing circuit may be separate from image sensor 10, located at a distance, or on a same circuit support, or event integrated with the image sensor.

Baffle 14 allows part of the light from stars in any of a wide range of directions to be passed. Compared to a baffle of the same length with internal walls that would be all parallel to the optical axis of objective 12, light from a larger range of directions is passed, be it partly, usually by at most one compartment of baffle 14. In this case the light is blocked by internal walls 142, 142a from the other compartments because these internal walls 142, 142a are provided at an angle to each other. Baffle 14 blocks light from directions that are too far off the optical axis. Thus sunlight is blocked out.

Because of the angle between the walls, the walls can be made as long as desired in the direction away from object 12, when the orientation of the walls is selected so that, as far as they are imaged on the image sensor, they are imaged in side view, only their thickness being visible. Thus the length can be selected to optimize blocking. In this case each compartment of baffle 14 passes light from a range of directions unhindered. Thus it is avoided that the fraction of incoming intensity that is passed in that range depends on the direction from which the intensity comes in. This makes the measurement of direction easier and more reliable.

Figure 3:
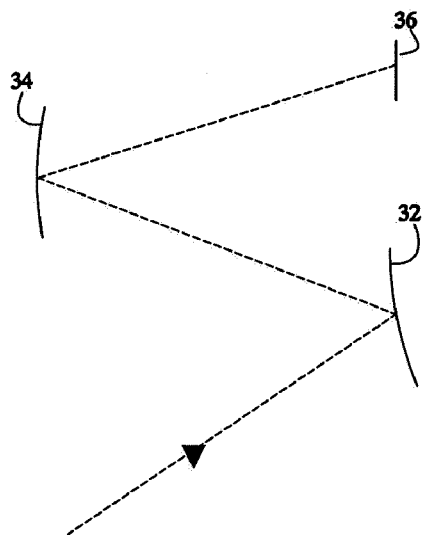
FIG. 3 shows an example of reflective optics for a star tracker.

Objective 12 may be a refractive objective made up of a plurality of lenses, or a single lens. FIG. 3 shows an example an alternative comprising reflective lenses. In this alternative the objective comprise an off-axis spherical mirror 32, a spherical mirror 34 and a virtual image plane 36, where the image sensor (not shown) may be located.

In an embodiment baffle 14 comprises a monolithic structure (i.e. not made by joining) comprising the sidewalls 140, 140*a* and the internal walls 142, 142*a*. In a further embodiment baffle 14 is manufactured by machining a block of starting material (e.g. aluminium) to remove the starting material in the space between the walls. Preferably all compartments are made while the block remains mounted in the machine that removes the material. This makes it possible to manufacture the baffle with high accuracy.

Figure 4:
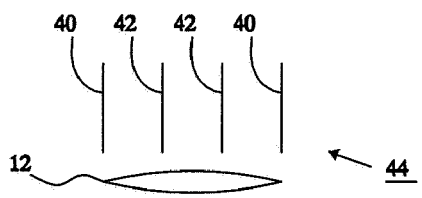
FIG. 4 shows a cross-section of a star tracker.
Figure 4:
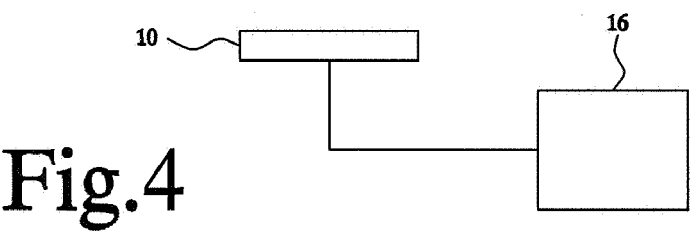

FIG. 4 shows an embodiment wherein parallel sidewalls 40 and internal walls 42 have been used in baffle 44. As will be appreciated the use of internal walls makes it possible to achieve the same blocking effect for light outside an allowed range of angles of incidence as with a longer baffle without internal walls. Although this baffle may work well, it has the disadvantage that the sensitivity strongly depends on the angle of incidence, which complicates processing and reduces the sensitivity for off centre directions.

Figure 5:
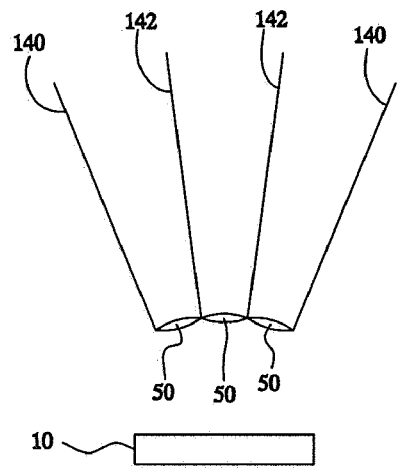
FIG. 5 shows a star tracker with a plurality of lenses.

FIG. 5 shows an embodiment wherein separate lenses 50 have been mounted in the respective compartments, at the bottom (the side nearest the image sensor). In the cross section of this figure only three lenses are shown, but it should be appreciated that preferably a two dimensional array of for example 3×3 lenses may be used. In an embodiment lenses 50 replace objective 12, so that no further lenses need be used between lenses 50 and image sensor 10. In another embodiment additional lenses (not shown) are used as well. The use of separate lenses has the effect that the range over which light will be scattered is reduced. This improves sensitivity and makes it possible to image the moon or sun via some compartments of the baffle for use in direction measurement without making it impossible to detect stars from other compartments.

Image sensor 10 may comprise a single integrated circuit, comprising a matrix of light sensing elements at regular distances from one another, e.g. a rectangular matrix of rows and columns of adjacent light sensing elements, with same distance between each pair of adjacent columns and a same (second) distance between each pair of adjacent rows. In another embodiment image sensor 10 is made by mounting a plurality of such matrixes on a monolithic base structure. Each matrix may be located to receive imaged light from a respective compartment of the baffle. This makes it possible to provide higher position resolution and reduces undesirable cross-coupling of effects due to light from different compartments. In another embodiment the image sensor comprises a plurality of such matrixes of different compartments, implemented in a single integrated circuit, separated from one another by conduction barriers that are significantly larger than conduction barriers between pixel positions within the matrixes.

Figure 6A:
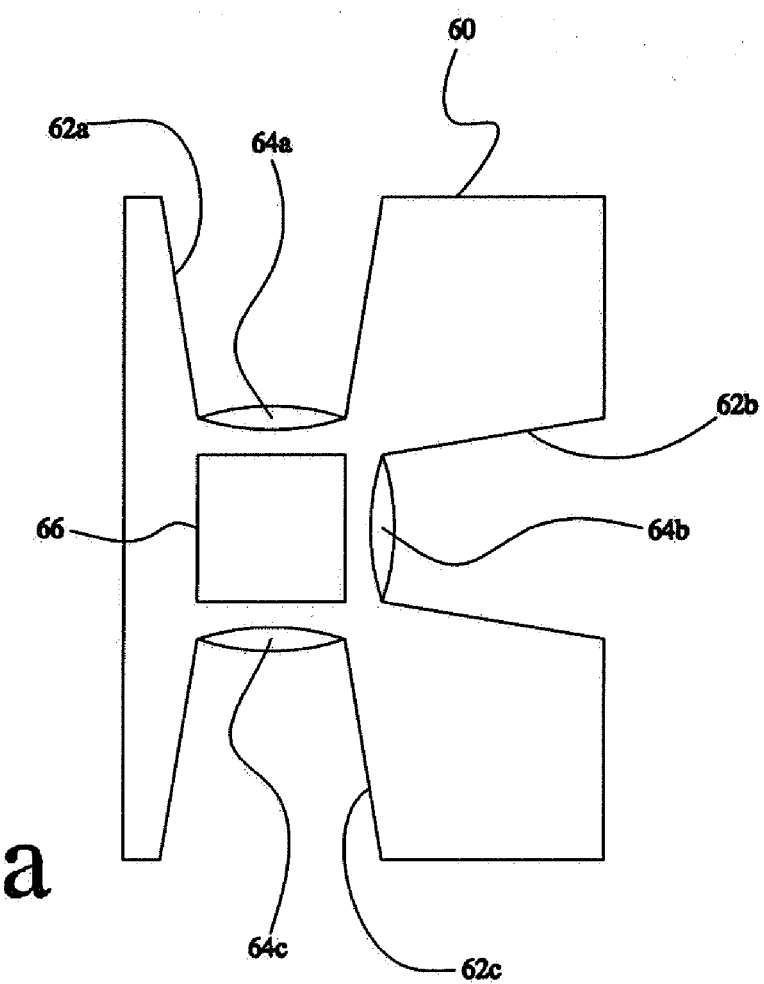
FIG. 6a-c show cross-sections of other star trackers.
Figure 6B:
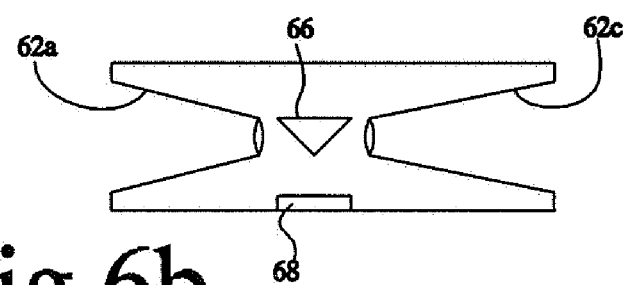

FIGS. 6*a-b* show another embodiment in cross section, with baffles 62*a-c*, lenses 64*a-c*, a reflecting pyramid 66 and an image sensor matrix 68. In this embodiment the star tracker comprises a box 60 with walls in which baffles 62*a-c* are provided. Lenses 64*a-c* are provided at the end of baffles 62*a-c*. Reflecting pyramid is located to reflect light from the lenses to image sensor matrix 68. Preferably at least the part of box 60 that contains baffles 62*a-c* is manufactured by machining a monolithic piece of material so that only the walls of box 60 and the walls of baffles 62*a-c* remain. Thus, accurate alignment of baffles 62*a-c* can be ensured. Preferably a ridge transverse to the surface of the baffle is left at the end of each baffle 62*a-c*. Lenses 64*a-c* are mounted against these ridges. Thus alignment of lenses 64*a-c* is also simplified. Preferably a single image sensor matrix 68 is uses. Thus also alignment of the image sensors presents no problem. But alternatively, separate image sensor matrixes (not shown) may be used, because correction for alignment errors of such matrixes can be easily performed.

The configuration of the figure provides for detection of location of celestial bodies in widely varying directions of minus ninety, zero and plus ninety degrees. Of course different directions may be used. In a further embodiment more than three baffles with lenses may be used, with center lines radiating from reflecting pyramid 66 in different directions in a plane. In this case reflecting pyramid 66 is configured to reflect light from each baffle to a detection plane. Thus celestial bodies in more directions can be detected.

In a further embodiment of such a star tracker with more than three baffles adjacent baffles meet each other so that an array of shared walls suffices.

Figure 6C:
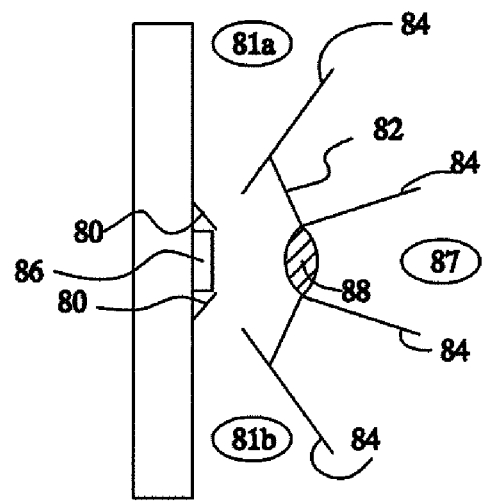

FIG. 6*c* shows a further embodiment in cross section wherein reflective optics are used for part of the baffle openings 81*a,b*. First optically active mirrors 80, are provided at the end of baffle walls of these openings and second optically active mirrors 82 are provided between walls 84 of successive baffle openings. The first and second mirrors 80, 82 cooperate to image light from the baffle openings 81*a,b* onto different area's on the sensor 86. That is, these mirrors 80, 82 are optically active in the sense that they are curved and located relative to each other to produce an focussing effect on the light. A lens arrangement equivalent to that of FIG. 3 may be used. In a third baffle opening 87 a lens 88 is provided to image light from that section onto a further area on sensor 86.

In one embodiment only the two openings 81*a,b* with mirrors shown in FIG. 6*c* are used. In another embodiment openings more than two such openings may be provided for along a cone of directions around the central axis through third opening 87. For example the cross section of FIG. 6*c* may apply to cross sections in mutually orthogonal planes, so that light from openings in four directions along the cone is imaged onto sensor 86 by four sets of first and second mirrors. More than four sets may be used, e.g. six sets so that light from openings in six directions along the cone is imaged onto sensor 86 by sic sets of first and second mirrors.

Further to FIG. 6*c* it should be appreciated that a larger number of baffle openings with a first mirror in it may be used alternating with "blind openings" wherein a second mirror is located to image light onto the sensor. Thus light from more than two directions in the same plane may be imaged onto sensor 86.

Figure 7:
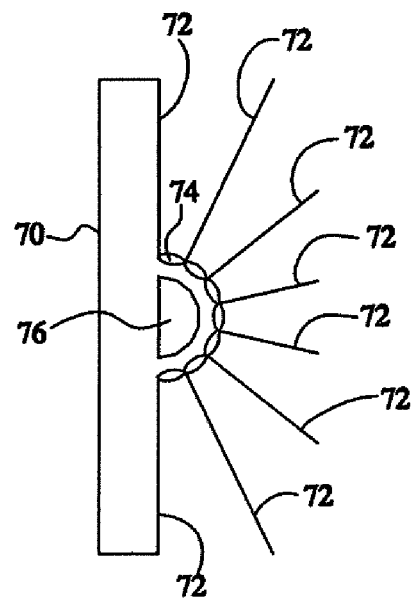
FIG. 7 shows a cross-section of further star tracker.

FIG. 7 shows a cross section of such a further star tracker with a box 70, baffle walls 72, lenses 74 (only one indicated) at the end of the baffles and a reflecting pyramid 78. It should be noted that the surfaces of adjacent baffles nearly meet each other in the plane of cross-section so that only thin shared walls remain. Away from the plane of cross-section these walls may split into separate walls for adjacent baffles, as the apertures of the baffles preferably have a circular shape. This star tracker may be manufactured as described for the preceding figure.

One component of a star tracker is the image sensor. Low cost low mass star sensor active pixel sensor devices may be used for example. Charge Coupled Devices and Active Pixel Sensors (APS) may be considered.

Currently, high performance startrackers use (preferably cooled) CCD detectors in their sensor-head. This is driven by the fact that despite advances in APS imagers, CCD detector technology is more mature and delivers a higher quantum efficiency and fillfactor at reduced noise levels. Therefore CCD imagers still offer the detector technology of choice in case the best optical performance is sought for and in case heritage is important.

The performance of CCD imagers has been largely optimized over the last decennia by technological improvements and by operational aspects, such as multi-pinned phase inverted mode of operation. And the CCD performance also improves by cooling the detector. Such measures lead to a reduction in dark current, which has two advantages. 1) A longer integration time can be afforded before saturating the detector, allowing to accumulate more signal, and 2) the noise associated with the darkcurrent is reduced. Active cooling of a detector however tends to be a power inefficient process, due to large heat leaks and bad thermal coupling in case external thermo electric coolers are used Possibilities to include on-chip or in-package thermo electric coolers need to be investigated for their potential to improve on the thermal constraints, so that CCD devices cannot (yet) be completely ruled out for use in future startrackers.

Active pixel sensor (APS) imagers have several advantageous aspects compared to CCD's. They can be produced more cost effectively, they are smaller and use less power. The main properties that lead to benefits for APS imagers are derived from the fact that APS imagers are manufactured on a less complicated and less expensive CMOS process and have an architecture that enables easier addressing of individual pixels, which is very advantageous for startrackers in space applications. Other major advantages of APS technology are: that they are cheaper to produce, that they run on a single supply voltage or at least a low number of voltages, that can be of fairly low voltage level(s) with low stability requirements (±10% is common), that analog and digital signal processing can be included on the same chip (amplifiers, A/D conversion, individual pixel or pixelgroup addressing), that lower capacitive loading is needed on the driving lines and therefore less power consumption, that, if required, "windowed" readout (of a selected region of interest) can be applied, allowing further power reduction or higher speed readout, that no blooming around saturated pixels. This facilitates a better performance of simultaneous detection in the FOV of objects with different brightness. Moreover APS images have better resistance to (cosmic) particle radiation.

However APS imagers also have disadvantages, such as a lower fillfactor, lower quantum efficiency, less UV response and the absence of a possibility to perform Time Delayed Integration (TDI) in the sensor. Low UV response and low quantum efficiency are disadvantages associated with the top layers on the chip which are there to provide interconnections. These layers tend to block and/or filter some of the incident light. The lower fillfactor has mainly to do with the surface area required to give room for the CMOS read-out circuitry. The CMOS APS is a relatively young device and one may expect that for the technological disadvantages future technological solutions will be found.

Several engineering solutions can be used to circumvent the problems associated with the low fillfactor. The most promising ones are bump bonding a detector chip to a dedicated readout circuit, (which is known per se for semiconductor infrared detectors) or back illuminating the detector. These technologies have been tested and are expected to lead to detectors with an increased fillfactor and quantum efficiency as well as a better UV response. Other technologies like the deposition of amorphous silicon on top of the entire active pixel array to enhance the infrared response and to increase fillfactor is also of interest. An apparent drawback of this technology is the limited response time, but this is not so important for a startracker application. An increased fillfactor can also be obtained by going to a process that uses a smaller geometry (like 0.13 micron) which is a trend that is anyhow expected to happen, since 0.18 micron processes are already being used for commercial APS imagers widely, and 0.13 micron devices are appearing.

In any event, the performance of active pixel sensors is expected to increase in the coming years whereas the performance of CCD's is expected to stay at the current level, because this technology is already very mature. Technological development will thus push the performance of APS devices to the performance of CCD's, but will allow the integration of more functionality, giving the technology an inherent advantage.

The comparison of CCD and APS performance is not easy to do in a clean fashion. The imaging section in an APS will virtually always be combined with on-chip features such as correlated double sampling amplifiers, ADC's, video processing features etc. These will be integrated on chip in a manner optimized and fully tailored to the image section (the pixels) of the device. The demonstrated performance of the APS is that of the already highly integrated total device, whereas in case of a CCD much more peripheral electronics will be required to verify its performance.

Additional advantages of APS based systems which are a direct revenue of the level of integration in the APS chip also need to be weighed in the comparison between CCD and APS like: lower power consumption (due to the higher integration and optimization), less EMC problems (due to shorter interconnects), less components, higher uniformity in performance (no separate chips used), lower recurring costs (no separate circuits and associated assembly and control).

Adding to this the capability to include digital signal processing circuitry which can perform fairly complicated tasks like star detection, false alarm reduction, motion detection etc, it becomes clear that active pixel sensors shall be considered as a very serious candidate for future startrackers.

With the exception of very demanding specific small FOV-high sensitivity startrackers or of startrackers on (slow) spinning spacecraft, which need TDI operation, it is expected that in the next decade CCD based imagers will be pushed out off the startracker market, in favour of APS-based equipment.

Given the comparatively high non-recurring costs associated with the development of an APS with specific processing functions implemented on chip, a careful trade should be performed regarding which functionality is to be included on chip. For instance in the LCMS chip from Cypress (Fillfactory), the processing on chip is deliberately limited to functions like: CDS amplification, A/D conversion, individual addressing capability, which are features generally applicable to all kind of startracker designs.

For any detector it can be stated that startrackers can work with small pixels. Using parametric models of a startracker front-end (optics, detector) in combination with stellar statistics (star availability, star type, etc) analyses can be performed which yield signal levels per unit of light collecting area. The light levels involved don't require a large full well capacity, and even diffraction limits in the optical front-end are not very important, if star images are deliberately increased to enable centroïding. This leads to potential system reductions by using smaller pixels in the detector. Also on this topic a careful trade off is needed, because pixel size reduction only helps in case the dark current is dominant and effects on for instance the fillfactor from a decrease in pixel size should be carefully considered.

Another component of the startracker front-end is the imaging optics. Most startrackers have an optical aperture diameter in the range of 3 to 6 cm and typically use 6 to 8 optical elements to provide a good achromatic image quality at the focal plane. For startrackers a good image quality is not directly associated with the smallest spotsize, since a high accuracy from startrackers is usually determined by sub-pixel centroïding, which requires a significant spotsize of at least a few pixels wide. Therefore the achromatic character of the optics might be more important than a small image size.

Good achromatic image quality means in this context that the centroïd of the spot is found at a similar position for all wavelengths concerned, so that startype has little influence on spot position). The next important parameter is the throughput of the optics. Because startrackers usually require the highest possible throughput for all wavelengths the detector is sensitive to, bandwidth limiting filters or otherwise spectral active structures are not favored.

The imaging optics currently used for startrackers is quite conventional and in general spherical glass based optics which require a large number of optical elements, causing the optical systems to be bulky and heavy. Novel manufacturing methods could potentially lead to compacter systems with a higher throughput at reduced weight and cost.

Options for reflective optics (by nature achromatic and knowing that experience with single point diamond turning is growing) are a-spherical optics (generally leading to a reduction of the number of components used), Diffractive optics (leading to a weight reduction), Plastic optics (a-spherical components common and light weight but these have to be tested for radiation tolerance and outgassing). Another possibility of the use of holographic optics.

An issue for the optics is the required size of the aperture, not only for the sake of the optics itself, but also for the straylight baffle required in front of the optics. Baffle dimensions are a strong function of the aperture size and reducing the optical diameter will also reduce the baffle dimensions and mass.

The reflective optics of FIG. 3 provides an example of the possibilities of (aspherical) reflective optics. A sensor with a conventional pixel size may be used (25 micron) by way of example. Even in this case the optics design is significantly smaller than in currently flying startrackers. The system has a good optical quality, is fully achromatic and will have a high throughput.

Because only two reflective surfaces are used, the straylight will be minimal, the transmission is high and associated mass and costs will be low. The design shown includes already (preliminary) baffles 30. The mechanical design of a system like this will be quite different from current startracker front-ends. It will be more compact, which has its advantages when looking at structural constraints like minimum eigenfrequencies.

The application of novel technologies for optics design and production is expected to lead to more compact optical heads for startrackers. Smaller heads simplify the use of multiple co-registered optical heads installed on a spacecraft, to effectively increase the FOV and the chance to observe enough bright stars that can be detected with the smaller optics.

Sensing stars while the sun or the moon are in the FOV or even sensing the sun and the moon as reference objects themselves may also be considered. The moon constitutes a much brighter and larger target then a star. But due to its apparent diameter of half a degree of arc its image will cover many pixels, so that the signal will be distributed and may be within the dynamic range of the detectors used (in case the pixels are not to small). The centroïding algorithm for a large object will be similar to that of stars. Therefore a startracker may use the moon also as an attitude reference (in order to increase accuracy the phase of the moon is preferably taken into account during the computation of the position of the moon, for example by means of a phase dependent position offset).

An issue of concern is whether the moon causes so much straylight (introduced from the surface texture or coating texture on the optical elements), that it would flood the entire FOV, rendering further star sensing impossible. The use of multiple startrackers which each cover part of the required total field of view could be a way of mitigating this effect.

Although the sun has a similar angular size as the moon, the luminosity is so much higher that the sun drives any detector into saturation unless special precautions are taken. To limit the light from the sun use may be made of a form of electrochromic coating whose transmission can be electrically controlled or an opto-chromatic coating which changes transmission depending on the amount of incident sunlight. If the amount of light on the detector can be sufficiently limited this way, the startracker can perform the task of a very high accuracy sunsensor. Although either of these coatings would make it impossible to see anything else but the sun, the straylight caused by direct sunlight illumination would most probably have a similar effect on the startracker. Therefore, like before, it may be advantageous to consider using multiple sensor heads in order to avoid loosing all functionality in case the sun comes within the field of view.

Objects of structural design may be to control degrees of freedom and reduce the number of components. Arcsecond or sub-arcsecond accurate startrackers require very stable mechanical systems in order to obtain their accuracy over varying temperatures and time. Designing for this level of accuracy is driven by carefully limiting the motions possible within the structure, and even more important between separate parts of the structure. The lenses of the imaging optics for instance are preferably kept at their relative positions quite accurately. The optics preferably are positioned with respect to the imager in a very stable manner in order to maintain the performance.

Stability and backlash free motion can be realized by use of flexible hinges, which limit the degrees of motion possible in a number of specific directions. However differences in coefficient of thermal expansion may still lead to motion. By carefully analyzing the mechanical setup, and designing the mechanical parts to be able to move in a controlled manner, it can however be assured that they all move in the wanted direction. This way the relative alignment of the major system parts can be assured. Careful limitation of the degrees of freedom not only reduces stress in the used material, but also gives full control over the thermal behavior of mechanical systems. Utilizing this technology it is for instance possible to compensate for defocusing over temperature, by careful selection of materials used during the design of the system.

Management of degrees of freedom will be useful to obtain the best possible performance for a startracker, on the other hand it could also lead to a situation where no calibration over temperature is required anymore (a-thermalized design). This could be a way of avoiding a costly temperature calibration exercise, thus reducing the overall costs for a startracker.

Another issue associated with the mechanical design is the manufacturing cost. High speed milling and other manufacturing processes have made it possible to produce complex mechanical parts in a cost effective manner. As compared to some ten years ago, manufacturing methods have considerably improved. The one thing that hasn't changed over the years is the benchmark that uses the number of components in a system as an indicator for system costs. Given the fact that each part needs to be manufactured, measured, documented, packaged, stored, etc, etc. . . . the overall costs associated with a part in general by far exceeds the cost of the basepart. Careful design and knowledge about limits of tool performance will allow to design complex parts that can ensure system performance over the control of manufacturing tolerances, in stead of through labor intensive and expensive shimming processes.

During the design of the next generation of startrackers, due attention will need to be given to the design of the mechanical components. This is both needed to ensure the best possible performance and the best possible repeatability during production, as well as the lowest cost manufacturing. Advances in rapid prototyping and nowadays even rapid manufacturing will allow to make more complex structures then ever before in a cost effective manner.

The data output by the startracker depends on the intelligence included in the detector head. As used herein the sensor head refers to the electronics comprising the image sensor and optional analog and digital signal processing circuits integrated with the image sensor or assembled in a same enclosure. When a simple detector head is used the power consumption will be less, but the amount of data transported over the datalink will be much increased. Alternatively, an intelligent sensor may be used, wherein the stars are detected, compared with the known starmap, and the orientation of the sensor head is computed. This requires significant processing power, and consequently the power consumption in the head (which in actual fact is now a full startracker) will increase and the datarate will go down.

Current startrackers have an update rate of about 1 second, which is enough for large 3 axis stabilized platforms. On the other hand, microsatellites are much more agile and need sensors that give an update on the pointing at a higher rate. Spinning satellites may also require a higher update rate. Increased processing capability will reduce the time needed for the Kalman filtering commonly performed on board startrackers, and update rates will be pushed to 10 Hz and beyond. High rotation rates will be limited by the amount of light collected in the sensor and the excess noise generated by the detector, but at least for three axis stabilized platforms an update rate of 10 Hz seems feasible.

When looking at the data interfaces concerned, several major subdivisions can be made: Analog video interface, Digital video interface, Digital data interface (X,Y,Z pointing and housekeeping).

Analog video interfaces to detector heads are not common due to the EMC and performance problems involved (largely restricting the distance between the sensor heads and the processing electronics) but will give the smallest optical heads. Digital video interfaces can be attractive in case one central processing unit is used to process data coming from several optical heads. Presuming a sensor with something like 500*500 up to 2000*2000 pixels and a 12 bit output which is updated at 1 to 10 Hz, the amount of data transmitted will be in the area of 3 to 500 Mbit/s. Most digital interfaces are raw data interfaces in the sense that some timing signals are send to the optical head that directly control the timing of the sensor and the digitized data is transmitted to the signal processing unit. These interfaces tend to be parallel interfaces which therefore require a fairly large amount of connections. For commercial applications standardized video data links are becoming common like the camera interface and the IEEE 1394 firewire interface. For space applications however no standardized interface is available yet although the spacewire interface could fulfill this task. When looking at the spacewire interface though it should be noted that circuits that are currently under development like the Saab Ericson RTI interface chip posses so much additional processing capability that these interface ASIC's can more than cover the data processing need for a startracker application. This leads to the striking conclusion that it is likely to see startrackers that have a spacewire interface but only output a couple of kilobits per second data. It should be noted that a startracker with an update rate of 10 Hz and X,Y,Z pointing outputs of 22 bits only outputs 660 bits/sec of raw data, which is a datarate that can be covered by all but the slowest wireless interfaces.

The digital data interface of a startracker can be build in several ways. There are a number of standards which are quite often used on board spacecraft and have both there pros and cons. A number of legacy standards like MIL-STD-1553 are not considered anymore for new applications and will likely fade out in the next couple of years. Other standards like RS422 and RS485 will most probably be around a little longer as they are cheap, reliable and widely used but in and outside the space domain. Most of these standards are point to point links and all of them are hard real-time.

When looking at current developments in the microsatellite realm, more and more people use single ended interfaces like $I^2C$ or microwire, and are violating the Single Point Distributed Grounding (SPDG) rules carefully nurtured during the last decennia. This is done because all the balanced drivers and load matching place a large burden on the power budgets.

More sophisticated networking schemes like CANbus may also be considered to bring the required solution. Even radically different schemes like wireless communication are seriously investigated (both optical and RF wireless). A goal in this quest is to reduce the onboard harnessing and maintain the high reliability connections people have come to expect, in the mean time increasing the data throughput. The increased data throughput is needed in order to be able to cope with ever increasing amounts of data that need to be handled (coming from the imaging instruments flown). For a startracker application this increased data throughput is not really an issue as most of the considered interfaces can handle more than the required amount of data in case anything else but the raw data is transmitted.

Four main considerations must be taken into account in case new data interfaces are selected. :Harnessing must be reduced, Timing must comply with the realtime control applications, EMC, Standardization is preferred in order to limit costs and enhance reuse of developments Reducing harness can be achieved by reducing the number of interface lines and their shielding provisions or by going to a networked solution like CANbus or spacewire. Reduction of interface lines will go hand in hand with increased complexity at both the sending and receiving end, or with using single ended interfaces. For the majority of applications, the use of single ended interfaces is not preferred due to EMC control problems. A more complex coding scheme could save some wires but would not lead to a drastic reduction.

Reducing harness can be achieved by reducing the number of interface lines, or by going to a networked solution like CAN bus. Reduction of interface lines will go hand in hand with increased complexity at both the sending and receiving end, or with using single ended interfaces. For the majority of applications, the use of single ended interfaces is not preferred due to EMC control problems, so a more complex coding scheme could save some wires but would not lead to a drastic change. Many more wires can be saved though by going to a networked environment, where point to point links are replaced by single or dual network loops. Although this approach has its drawbacks also, automotive applications have proven that it is a scheme that has a realtime control capability and can work reliably under adverse circumstances. For this reason, ESA has selected CANbus as their future "standard to be" interface for low datarate sensors.

Wireless data interfaces is the most drastic way of reduction of the amount of wiring required on board a spacecraft. This solution is currently actively investigated by ESA and seems promising for some applications. It should be noted though that there are also some drawbacks identified. A wireless connection requires a receiver which comes at additional costs. Wireless links are hampered by things like multipath reflections or propagation losses, which will be very difficult to predict. In addition to this, most commercially very successful standards like IEEE 802.11 are not deterministic and don't offer a high Quality of Service, which makes them not really suited for realtime control applications. And last but not least, for sensors that require very little power wireless networked solutions cause a large power overhead.

Nevertheless a wireless link could be a viable solution for a startracker, since several startrackers (in a multiple head configuration) and other (attitude) sensors could be interrogated with one receiver; massive redundancy schemes can be implemented to increase reliability (for instance three receivers and three redundant heads) and EMC problems will probably be less when no wires are used anymore.

The invention claimed is:

1. A star tracker, comprising:
an image sensing arrangement,
optics configured to image incoming light on the image sensing arrangement, and
a light baffle, the optics being located between the light baffle and the image sensing arrangement, the light baffle comprising an array of walls, including sidewalls and at least one internal wall between the sidewalls, the internal wall separating a space between the sidewalls into separate subspaces.

2. A star tracker according to claim 1, wherein the sidewalls and the at least one internal wall are directed at mutually different angles relative to a viewing direction of the star tracker.

3. A star tracker according to claim 2, wherein the at least one internal wall separates a pair of successive ranges of angles from which the image sensing arrangement is able to sense light along at least part of the pair of successive ranges of angles and wherein the at least one internal wall has an orientation corresponding to substantially meeting ends of these ranges.

4. A star tracker according to claim 1, wherein the sidewalls and the at least one internal wall lie in virtual planes that have a common line of intersection.

5. A star tracker according to claim 1, wherein the at least one internal wall comprises protrusions transverse to a main plane of the internal wall at the end of the internal wall that extends towards the image sensing arrangement.

6. A star tracker according to claim 2, wherein the sidewalls are oriented along directions from which light is imaged to an edge of an area of the image sensing arrangement from which image data is sensed, the internal wall or walls being oriented so that the internal wall or walls subdivide a range of orientations between the orientations of the sidewalls into equal sized sub-ranges.

7. A star tracker according to claim 1, wherein the internal walls separate the light baffle into compartments, and wherein the optics comprise a single common objective for imaging light passed by different ones of the compartments onto the image sensing arrangement.

8. A star tracker according to claim 7, wherein the sidewalls extend to edges of an aperture stop of the common objective.

9. A star tracker according to any one of claims 1 to 8, wherein the internal walls separate the light baffle into compartments, the optics comprising a plurality of lenses, each for a respective one of the compartments, located at ends of the sidewalls and the internal walls, that extend towards the image sensing arrangement and bound the respective one of the compartments.

10. A star tracker according to claim 1, wherein the internal walls separate the light baffle into compartments, and wherein the image sensing arrangement comprises an integrated circuit with a matrix of light sensing elements located to receive imaged light from all compartments.

11. A star tracker according to claim 1, wherein the internal walls separate the light baffle into compartments, and wherein the image sensing arrangement comprises a plurality of separate matrixes of light sensing elements, each matrix being located to receive imaged light from a respective compartment.

12. A star tracker according to claim 1, comprising an orientation computing circuit, configured to compute an orientation of the star tracker relative to a combination of celestial objects, from measured positions of the celestial objects in one or more images sensed by the image sensing arrangement at a common orientation of the image sensing arrangement relative to the celestial objects.

13. A method of measuring directions towards celestial objects, the method comprising baffling light before imaging the light onto an image sensing arrangement, using a light baffle that comprises an array of walls, including sidewalls and at least one internal wall between the sidewalls, the internal wall separating a space between the sidewalls into separate subspaces.

14. A star tracker according to claim 3, wherein the sidewalls are oriented along directions from which light is imaged to an edge of an area of the image sensing arrangement from which image data is sensed, the internal wall or walls being oriented so that the internal wall or walls subdivide a range of orientations between the orientations of the sidewalls into equal sized sub-ranges.

* * * * *